(12) United States Patent
Zhong et al.

(10) Patent No.: US 8,387,275 B2
(45) Date of Patent: Mar. 5, 2013

(54) METHOD FOR DRYING SLUDGE

(75) Inventors: Huansheng Zhong, Guangdong (CN);
Lei Li, Guangdong (CN); Jiacong Wu,
Guangdong (CN); Xuewei Wu,
Guangdong (CN); Zhimin Sun,
Guangdong (CN); Haiying Yang,
Guangdong (CN)

(73) Assignee: Guangzhou Pude Environmental Protection Equipment, Ltd.,
Guangdong (CN)

( * ) Notice: Subject to any disclaimer, the term of this patent is extended or adjusted under 35 U.S.C. 154(b) by 411 days.

(21) Appl. No.: 12/863,443

(22) PCT Filed: May 28, 2008

(86) PCT No.: PCT/CN2008/071117
§ 371 (c)(1),
(2), (4) Date: Jul. 19, 2010

(87) PCT Pub. No.: WO2009/094868
PCT Pub. Date: Aug. 6, 2009

(65) Prior Publication Data
US 2010/0293808 A1 Nov. 25, 2010

(30) Foreign Application Priority Data
Jan. 25, 2008 (CN) .......................... 2008 1 0026039

(51) Int. Cl.
*F26B 11/03* (2006.01)
(52) U.S. Cl. ............ 34/568; 34/517; 435/162; 210/109; 134/102.1

(58) Field of Classification Search .................... 34/380, 34/381, 413, 468, 517, 74, 181; 134/95.1, 134/102.1, 109, 200; 210/38; 435/99, 162
See application file for complete search history.

(56) References Cited

U.S. PATENT DOCUMENTS

| | | | | |
|---|---|---|---|---|
| 2,491,060 A * | 12/1949 | Robinson | | 34/380 |
| 2,702,433 A * | 2/1955 | Cohen | | 34/468 |
| 2,731,731 A * | 1/1956 | Hink, Jr. et al. | | 34/294 |
| 4,811,494 A * | 3/1989 | Miller | | 34/337 |
| 5,220,733 A * | 6/1993 | Bothe et al. | | 34/426 |
| 5,283,959 A * | 2/1994 | Nagayoshi et al. | | 34/591 |
| 6,470,597 B1 * | 10/2002 | Stipp | | 34/422 |
| 6,993,855 B2 * | 2/2006 | Ibaraki et al. | | 34/312 |
| 7,404,262 B2 * | 7/2008 | Jurkovich et al. | | 34/381 |
| 7,883,884 B2 * | 2/2011 | Bonde et al. | | 435/236 |
| 8,236,535 B2 * | 8/2012 | Medoff et al. | | 435/162 |
| 2004/0237335 A1 * | 12/2004 | Ibaraki et al. | | 34/486 |
| 2010/0199514 A1 * | 8/2010 | Camisa | | 34/201 |
| 2010/0293808 A1 * | 11/2010 | Zhong et al. | | 34/379 |
| 2012/0198718 A1 * | 8/2012 | Odueyungbo | | 34/60 |

* cited by examiner

*Primary Examiner* — Stephen M. Gravini

(57) ABSTRACT

A method for drying sludge comprising the following steps: (a) Dry dehydrated sludge to obtain a carrier for drying sludge (6); (b) Transport the carrier for drying sludge (6) and dehydrated sludge to be dried (1) to a stirring and mixing apparatus (2) for stirring and mixing and thereby obtain mixed sludge; (c) Transport the mixed sludge (3) to a drying apparatus (4) for drying; (d) Repeat steps (b) and (c); characterized in that in said step (d) a portion of the mixed sludge (3) obtained from the stirring and mixing apparatus (2) which is in an amount determined by amount of sludge carrier (6) required for drying is extracted and transported to the drying apparatus (4) for drying and the rest of the mixed sludge is discharged as final product (7).

11 Claims, 3 Drawing Sheets

METHOD FOR DRYING SLUDGE

BACKGROUND OF THE INVENTION

The present invention relates generally to a method for treating sludge, and more specifically relates to a sludge drying method that is able to treat sludge with different water contents and that enables the reuse of treated sludge.

The existing methods for drying sludge commonly used in China and overseas generally disposes centrifugally dehydrated sludge with a water content of 80-85% or sludge dehydrated by frame and filter press with a water content of 70-75 for direct drying. The specific steps of method 1 comprise the following: Scatter the dehydrated sludge or press the dehydrated sludge into strips first and then transport the dehydrated sludge to a drying apparatus for drying. After drying in the drying apparatus, the dried sludge is discharged as the final product of drying. Water content of the resulting dried sludge is generally around 10%. The specific steps of method 2 comprise the following: The dehydrated sludge is first transported to a sludge drying apparatus for scattering or pressing into strips; then, dry the dehydrated sludge in the drying apparatus. After drying in the drying apparatus, the dried sludge is discharged as the final product of drying. Water content of the resulting dried sludge is generally around 10%. The specific steps of method 3 comprise the following: Mix (remix) the dried sludge with dehydrated sludge to be dried for granulation first and then transport the mixture to a drying apparatus for drying. After drying in the drying apparatus, the dried sludge is discharged as the final product of drying. Water content of the resulting dried sludge is generally around 10%. Efficiency of evaporating water during the drying process varies with different drying apparatus and hence the time required for drying generally varies between 2 to 8 hours. The drying temperature of the drying apparatus for low temperature drying is generally 80 to 130° C. and the drying temperature for medium temperature drying is generally 200 to 400° C. High temperature drying is seldom used. The said methods above have some serious problems and the major one concerns the high operation costs which are hardly economically affordable. Besides, equipment investment is also high; locally built sludge treatment plants are difficult to perform orderly because the equipment and techniques overseas cannot be adapted to specific local conditions.

The main reason for the above problems is that sludge drying consumes excessive energy. Such over-consumption of energy is due to the excessive high water content of the dehydrated sludge to be dried, resulting in large amount of water to be evaporated during drying and dehydration. Due to the excessively high water content of the dehydrated sludge to be dried, the sludge to be dried increases in size and mass and therefore the amount of dehydrated sludge also increases. As a result, the workload of sludge drying equipment increases while the amount of sludge to be treated by the sludge drying equipment per unit time also increases. Since sludge with a water content of 60-80% is more viscous and difficult to be scattered, heat transfer and mass transfer are hindered. Sludge with a water content of 40-60% is the most viscous and the most difficult to be scattered, so mass transfer and heat transfer of sludge drying are hindered the most. Furthermore, sludge added with PAM before dehydration and then dehydrated by way of centrifugal dehydration causes uniting and twisting sludge floc. The twisted sludge floc locks water inside the sludge and makes it difficult to separate and remove water from the sludge.

Patent application number 200610113411.7 with the publication number CN1931753A published on 21 Mar. 2007 and entitled "A method for drying and incinerating sludge" discloses a method which comprises the following steps: Step 1, heat sludge with a water content of 95% to 40-60° C. and then dehydrate the sludge in a mechanically operated dehydration apparatus to lower the water content of the sludge to 65-80%. Step 2, granulate the sludge to form round particles each of a diameter of 1-3 mm. Step 3, mix the granulated sludge with dry sludge powder for the dry sludge powder to adhere onto the surface of the granulated sludge. Step 4, heat and dry the granulated sludge in a fluidized bed and separate it from heating gas. Step 5, increase the temperature to 50-60° C. before incineration and then incinerate the granulated sludge in an incinerator. Part of the heat produced by incineration is used by a drying apparatus for drying wet sludge. As sludge with a water content of 95% is first heated to 45-60° C. and then mechanically dehydrated, energy consumption is significantly increased. It is because sludge with a water content of 95% is very great in size and mass due to its extremely high water content. Such sludge at least doubles in size and mass in comparison with dehydrated sludge with a water content of 80%. A significant amount of energy is therefore wasted for heating up such sludge. Besides, the high impurity content of local sludge often causes damages to the heat pipe when the sludge is dried by indirect heating using a heat pipe fluidized bed, therefore hindering normal operation. Also, as sludge with a water content of 75-80% is very viscous and difficult to granulate, granulated particles stick to one another very easily.

Patent application number 20061006106.2 with the publication number CN1884154A published on 27 Dec. 2006 and entitled "A method of drying a sludge carrier" discloses a method which comprises the following steps: 1, Pre-treat the sludge by way of deodorizing the sludge and passivating heavy metals therein. 2. Mix the pre-treated sludge with dry sludge powder in a mass proportion of 1 to 1-5 and then high speed stir for conditioning at a speed of 50-150 revolutions per minute and a linear velocity of 78.54-235.62 m per minute. 3. Dispose the conditioned sludge in a curing area for aerobic curing by turning it over once in 6-10 hours until the water content of the conditioned sludge is lowered to 20-25%. 4. When the conditioned sludge is cured, it is disposed for drying in a hot air system for 6-10 minutes under a hot air input of 10,000-15,000 $m^3$ per hour and the output dry sludge powder is controlled at a water content of less than 10%. This method requires large area for aerobic curing and it is significantly affected by weather conditions for sludge to be naturally dried to attain a water content of 20-25%.

BRIEF SUMMARY OF THE INVENTION

In view of the aforesaid disadvantages now present in the prior art, the present invention provides an efficient method for drying sludge. The method of the present invention consumes low level of energy and requires short time for drying. The investment and operation costs are low. The method is applicable to sewage, sludge for water treatment plants and other kinds of sludge. Its operation is also simple and convenient.

The technical proposal of the present invention is realized as follows: A sludge drying method comprising the steps as follows:

(1) Dry dehydrated sludge for use as a carrier for drying sludge;

(2) Transport the carrier for drying sludge and dehydrated sludge to be dried to a stirring and mixing apparatus for stirring and mixing and thereby obtain mixed sludge;

(3) Transport the mixed sludge to a drying apparatus for drying;

(4) Repeat steps (2) and (3);

The key is that in said step (4) a portion of the mixed sludge obtained from the stirring and mixing apparatus which is in an amount determined by amount of sludge carrier required for drying is extracted and transported to the drying apparatus for drying and thereby obtaining the carrier for drying sludge whereas the rest of the mixed sludge is discharged as final product.

In said step (1), the dehydrated sludge to be dried has a water content of 51-69%.

The carrier for drying sludge has a water content of 1-10% and a particle size of 0.25-1.0 mm in diameter.

In said step (2), the portion of the mixed sludge obtained from the stirring and mixing apparatus after mixing for transporting to the drying apparatus and the rest of the mixed sludge being the final product both have a water content of 25-35%.

The mixed sludge after being mixed in the stirring and mixing apparatus in said step (2) has a mixing ratio of the dehydrated sludge to the carrier for drying sludge of 1 to 0.45-1 to 3.

In said step (1) to step (4), sludge drying temperature is 70-200° C., input air temperature is 150-450° C., mixed temperature of sludge and hot air is 70-250° C. and temperature of tail gas is 50-120° C.

In said step (2), stirring is performed at a linear velocity of 100-527 m per minute and an angular velocity of 55-280 revolutions per minute.

The dehydrated sludge of said step (1) is obtained by dehydration of sludge produced by water treatment, or sludge sediments from lakes, ponds, rivers, streams, channels, ditches or drainage, or sludge produced by light industries, chemical industries and food processing industries.

In order to realize the second method of the present invention, the said sludge drying method comprises the steps as follows:

(1) Use dried sludge, fly ashes or dry clay directly as a carrier for drying sludge;

(2) Transport the carrier for drying sludge and dehydrated sludge to be dried to a stirring and mixing apparatus for stirring and mixing and thereby obtain mixed sludge;

(3) Transport the mixed sludge to a drying apparatus for drying;

(4) Repeat steps (2) and (3);

In said step (4) a portion of the mixed sludge obtained from the stirring and mixing apparatus which is in an amount determined by amount of sludge carrier required for drying is extracted and transported to the drying apparatus for drying and thereby obtaining the carrier for drying sludge whereas the rest of the mixed sludge is discharged as final product.

In said step (2), the dehydrated sludge to be dried has a water content of 51-69%.

The carrier for drying sludge has a water content of 1-10% and a particle size of 0.25-1.0 mm in diameter.

In said step (2), the portion of the mixed sludge obtained from the stirring and mixing apparatus after mixing for transporting to the drying apparatus and the rest of the mixed sludge being the final product both have a water content of 25-35%.

The mixed sludge after being mixed in the stirring and mixing apparatus in said step (2) has a mixing ratio of the dehydrated sludge to the carrier for drying sludge of 1 to 0.45-1 to 3.

In said step (1) to step (4), sludge drying temperature is 70-200° C., input air temperature is 150-450° C., mixed temperature of sludge and hot air is 70-250° C. and temperature of tail gas is 50-120° C.

In said step (2), stirring is performed at a linear velocity of 100-527 m per minute and an angular velocity of 55-280 revolutions per minute.

The dehydrated sludge of said step (2) is obtained by dehydration of sludge produced by water treatment, or sludge sediments from lakes, ponds, rivers, streams, channels, ditches or drainage, or sludge produced by light industries, chemical industries and food processing industries.

In order to realize the third method of the present invention, the said sludge drying method comprises the steps as follows:

(1) Use dried sludge, fly ashes or dry clay directly as a carrier for drying sludge;

(2) Transport the carrier for drying sludge and dehydrated sludge to be dried to a stirring and mixing apparatus for stirring and mixing and thereby obtain mixed sludge;

(3) Transport the mixed sludge to a drying apparatus for drying;

(4) Repeat steps (2) and (3);

A portion of the dried sludge obtained from the drying apparatus in said step (3) which is in an amount determined by amount of sludge carrier required for drying is extracted and transported to the stirring and mixing apparatus for stirring and mixing with the dehydrated sludge to be dried and thereafter transported to the drying apparatus for drying. The rest of the dried sludge still being the carrier for drying sludge is then transported to another stirring and mixing apparatus for stirring and mixing with the dehydrated sludge to be dried and thereby obtaining final product of sludge drying.

In said step (2), the dehydrated sludge to be dried has a water content of 51-69%.

The carrier for drying sludge has a water content of 1-10% and a particle size of 0.25-1.0 mm in diameter.

In said step (4), the final product of sludge drying has a water content of 1-51%.

In said step (1) to step (4), sludge drying temperature is 70-200° C., input air temperature is 150-450° C., mixed temperature of sludge and hot air is 70-250° C. and temperature of tail gas is 50-120° C.

In said step (2), stirring is performed at a linear velocity of 100-527 m per minute and an angular velocity of 55-280 revolutions per minute.

The dehydrated sludge of said step (2) is obtained by dehydration of sludge produced by water treatment, or sludge sediments from lakes, ponds, rivers, streams, channels, ditches or drainage, or sludge produced by light industries, chemical industries and food processing industries.

The present invention has the following advantages: In comparison to existing sludge drying methods, use of the method according to the present invention to dry sludge consumes significantly less amount of energy. (1) By means of carrier drying, the dehydrated sludge with a water content of 51-69% is mixed with the sludge carrier with a water content of 1-10%. By means of such remixing of the dried sludge, the sludge to be transported to the sludge drying apparatus for drying has a water content of around 30%, and fine granulated sludge which favors mass transfer and heat transfer during sludge drying is formed, and the water content range which restricts mass transfer and heat transfer during sludge drying, i.e. the water content range of 40-60% within which the sludge is the most viscous, is avoided. (2) By means of carrier drying, the dehydrated sludge with a water content of around 51-69% is mixed with the sludge carrier with a water content of 1-10%. By means of such remixing of the dried sludge and the control of the stirring and mixing process, fine granulated sludge can be formed and the efficiency of mass transfer and heat transfer during the process of sludge drying can be increased to the maximum extent, thereby reducing the energy consumed by sludge drying. (3) In comparison with the existing sludge drying methods which control the water content of the final product at around 10%, the present invention controls the water content of the final product of sludge drying at around 30%, thereby reducing the amount of water to be removed from the sludge by around 20%, and so reducing significant amount of energy consumed by drying sludge; (4) In comparison with the existing and commonly used methods which dry dehydrated sludge with a water content of around 80%, drying of dehydrated sludge with a water content of only 51-69% significantly reduces the amount of water to be evaporated during the sludge drying process and thereby significantly reduces the amount of energy to be consumed by sludge drying. (5) Use of gas produced by burning and heated air to heat the sludge directly while using the method of parallel-flow heating at the same time can facilitate quick heating of the mixed sludge, shorten the time for drying and increase drying efficiency because gas mixture with the highest temperature is the first to contact the dehydrated sludge. On the other hand, as sludge is directly heated by hot gas, loss of heat energy by conduction during indirect heating is reduced and less amount of energy is consumed for drying sludge. Furthermore, by means of optimal controlling the temperature, the air input and the time for drying maximize the drying effect and minimize the energy consumed by the drying process.

As compared with the existing and commonly used drying methods, the method according to the present invention significantly reduces the workload of sludge drying apparatus. Provided that the solid content of the sludge is the same, the size and mass of dehydrated sludge with a water content of 80% are two times over dehydrated sludge with a water content of 60%. Therefore, the sludge drying workload as well as the workload of the required equipment for dehydrated sludge with a water content of 80% are two times over dehydrated sludge with a water content of 60%.

Due to the significant reduction of energy consumed by sludge drying, operation costs are significantly reduced. As the workload of sludge drying apparatus is significantly reduced, the investment in sludge drying is also significantly reduced.

DETAILED DESCRIPTION OF THE INVENTION

Figure 1:
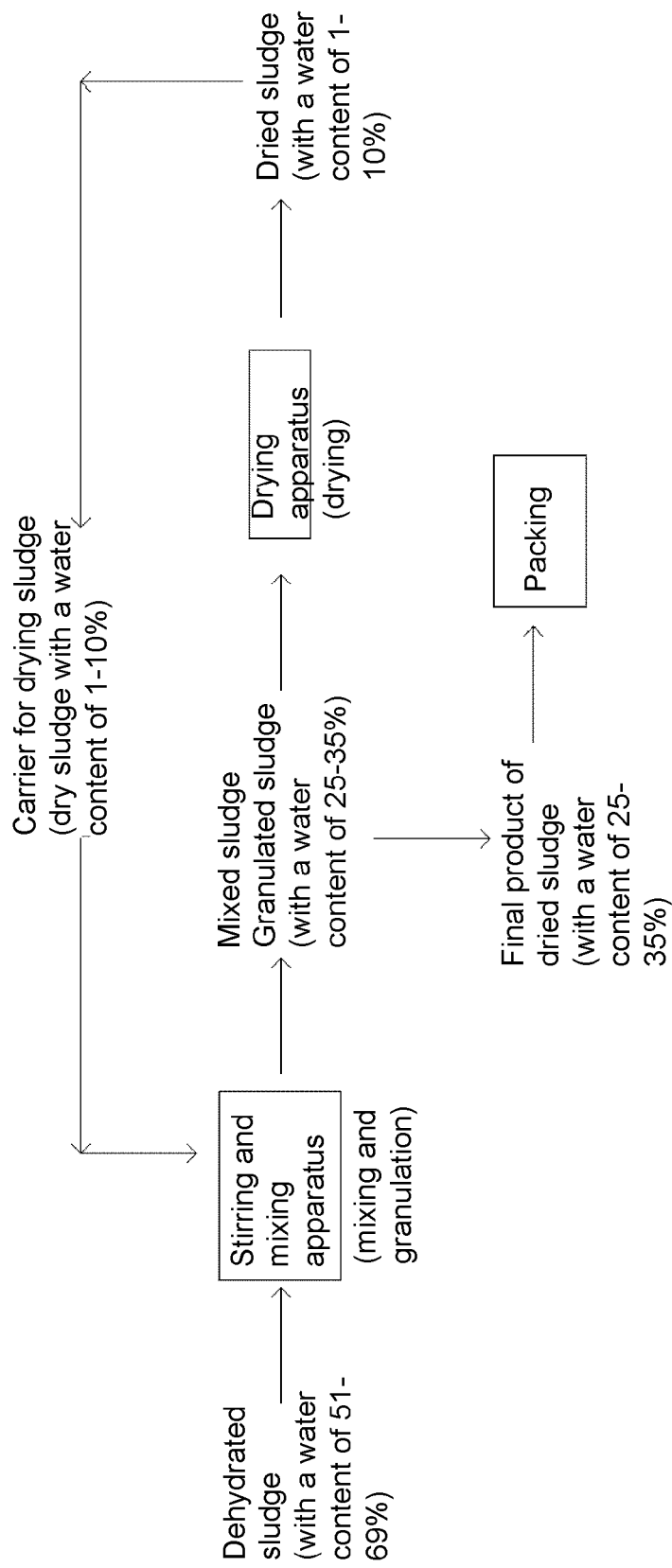
FIG. 1 is the flow chart of the first method of the present invention.

The first method according to the present invention is described as follows:

As shown in FIG. 1, the method according to the present invention comprises the following steps: (1) Dry dehydrated sludge for use as a carrier for drying sludge; (2) Transport the carrier for drying sludge and dehydrated sludge to be dried to a stirring and mixing apparatus for stirring and mixing and thereby obtain mixed sludge; (3) Transport the mixed sludge to a drying apparatus for drying; (4) Repeat steps (2) and (3); In said step (4) a portion of the mixed sludge obtained from the stirring and mixing apparatus which is in an amount determined by amount of sludge carrier required for drying is extracted and transported to the drying apparatus for drying and thereby obtaining the carrier for drying sludge whereas the rest of the mixed sludge is discharged as final product. In said step (1), the dehydrated sludge to be dried has a water content of 51-69%, the carrier for drying sludge has a water content of 1-10% and a particle size of 0.25-1.0 mm in diameter. In said step (2), the portion of the mixed sludge obtained from the stirring and mixing apparatus after mixing for transporting to the drying apparatus and the rest of the mixed sludge being the final product both have a water content of 25-35%. In said step (1) to step (4), sludge drying temperature is 70-200° C., input air temperature is 150-450° C., mixed temperature of sludge and hot air is 70-250° C. and temperature of tail gas is 50-120° C. In said step (2), stirring is performed at a linear velocity of 100-527 m per minute and an angular velocity of 55-280 revolutions per minute.

The dehydrated sludge of said step (1) is obtained by dehydration of sludge produced by water treatment, or sludge sediments from lakes, ponds, rivers, streams, channels, ditches or drainage, or sludge produced by light industries, chemical industries and food processing industries.

The dehydrated sludge as mentioned above is obtained from a plate and frame filter press after pressing and filtering.

Embodiment 1 of the first method according to the present invention is described as follows:

A pressed and filtered cake of sludge (dehydrated sludge being dehydrated by pressing and filtering) obtained from a plate and frame filter press with a water content of 65% is transported to a stirring and mixing apparatus by a spiral conveyor for mixing with dried sludge with a water content of 1.8% which is transported to the stirring and mixing apparatus from a dry storehouse. The transporting speed of the dried sludge is 14 kg per minute, the ratio of dry sludge to wet sludge is fixed at 1.15 to 1 and the transporting speed of wet (dehydrated) sludge is 12 kg per minute. The mixed sludge discharged from the stirring and mixing apparatus after mixing has a water content of 31%. A portion of the mixed sludge is then used as a carrier for drying sludge and continues to be dried whereas the rest of the mixed sludge is packed as final product after drying. The resulting final product of dried sludge has a water content of 31%.

Embodiment 2 of the first method according to the present invention is described as follows:

A pressed and filtered cake of sludge (dehydrated sludge being dehydrated by pressing and filtering) obtained from a plate and frame filter press with a water content of 51% is transported to a stirring and mixing apparatus by a spiral conveyor for mixing with dried sludge with a water content of 2.1% which is transported to the stirring and mixing apparatus from a dry storehouse. The transporting speed of the dried sludge is 14 kg per minute, the ratio of dry sludge to wet sludge is fixed at 0.8 to 1 and the transporting speed of wet sludge is around 17.5 kg per minute. The mixed sludge discharged from the stirring and mixing apparatus after mixing has a water content of 29%. A portion of the mixed sludge is then used as a carrier for drying sludge and continues to be dried whereas the rest of the mixed sludge is packed as final product after drying. The resulting final product of dried sludge has a water content of 29%.

Embodiment 3 of the first method according to the present invention is described as follows:

A pressed and filtered cake of sludge (dehydrated sludge being dehydrated by pressing and filtering) obtained from a plate and frame filter press with a water content of 58% is transported to a stirring and mixing apparatus by a spiral conveyor for mixing with dried sludge with a water content of 2.5% which is transported to the stirring and mixing apparatus from a dry storehouse. The transporting speed of the dried sludge is 12 kg per minute, the ratio of dry sludge to wet sludge is fixed at 0.9 to 1 and the transporting speed of wet sludge is around 13.3 kg per minute. The mixed sludge discharged from the stirring and mixing apparatus after mixing has a water content of 32%. A portion of the mixed sludge is then used as a carrier for drying sludge and continues to be dried whereas the rest of the mixed sludge is packed as final product after drying. The resulting final product of dried sludge has a water content of 32%.

Embodiment 4 of the first method according to the present invention is described as follows:

A pressed and filtered cake of sludge (dehydrated sludge being dehydrated by pressing and filtering) obtained from a plate and frame filter press with a water content of 68% of water is transported to a stirring and mixing apparatus by a spiral conveyor for mixing with dried sludge with a water content of 1.6% which is transported to the stirring and mixing apparatus from a dry storehouse. The transporting speed of the dried sludge is 14 kg per minute, the ratio of dry sludge to wet sludge is fixed at 1.3 to 1 and the transporting speed of wet sludge is around 10.8 kg per minute. The mixed sludge discharged from the stirring and mixing apparatus after mixing has a water content of 30%. A portion of the mixed sludge is then used as a carrier for drying sludge and continues to be dried whereas the rest of the mixed sludge is packed as final product after drying. The resulting final product of dried sludge has a water content of 30%.

Embodiment 5 of the first method according to the present invention is described as follows:

A pressed and filtered cake of sludge (dehydrated sludge being dehydrated by pressing and filtering) obtained from a plate and frame filter press with a water content of 63% is transported to a stirring and mixing apparatus by a spiral conveyor for mixing with dried sludge with a water content of 2.3% which is transported to the stirring and mixing apparatus from a dry storehouse. The transporting speed of the dried sludge is 15 kg per minute, the ratio of dry sludge to wet sludge is fixed at 1.2 to 1 and the transporting speed of wet sludge is around 12.5 kg per minute. The mixed sludge discharged from the stirring and mixing apparatus after mixing has a water content of 30%. A portion of the mixed sludge is then used as a carrier for drying sludge and continues to be dried whereas the rest of the mixed sludge is packed as final product after drying. The resulting final product of dried sludge has a water content of 30%.

Figure 2:
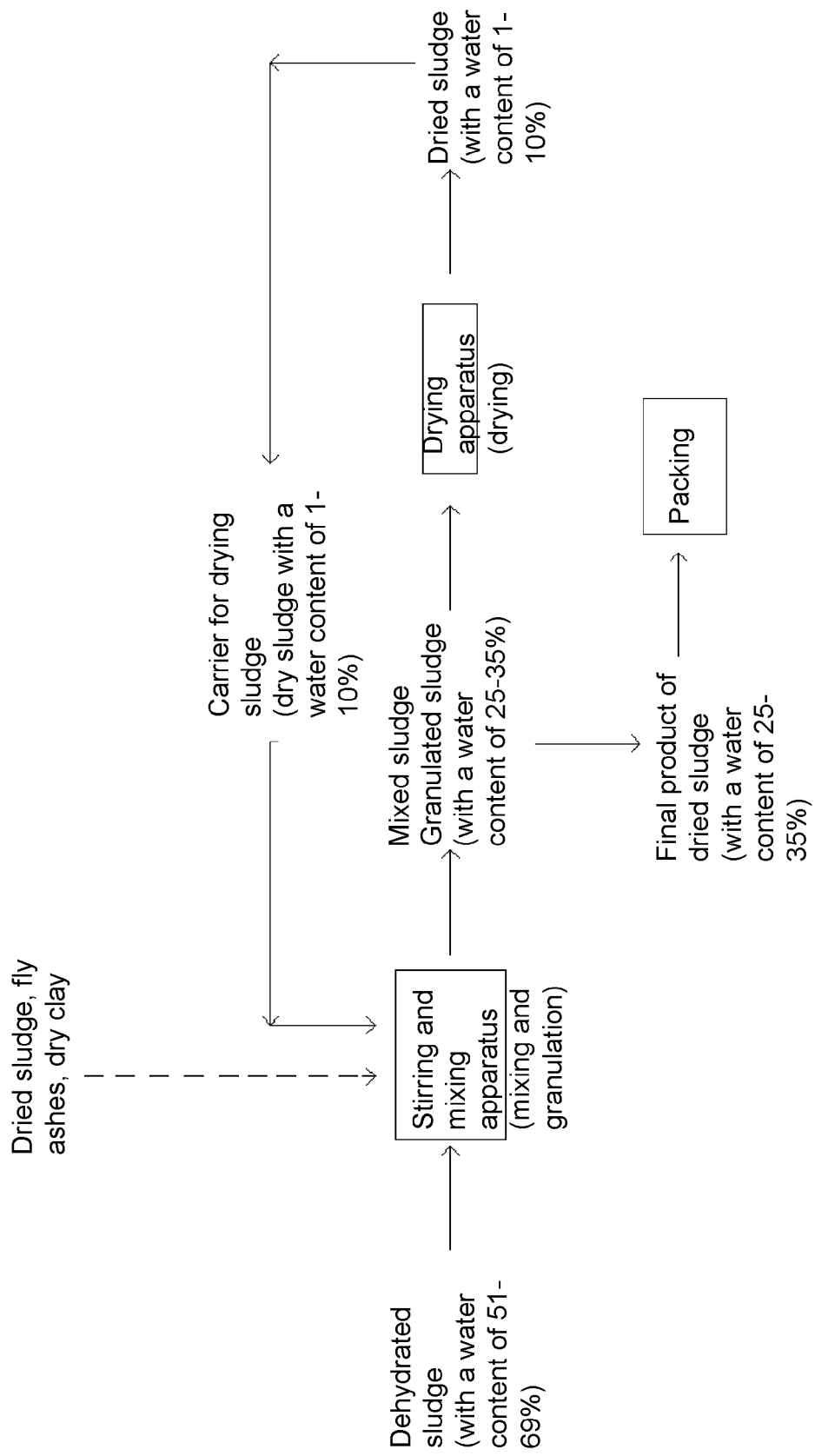
FIG. 2 is the flow chart of the second method of the present invention.

The second method according to the present invention is described as follows:

As shown in FIG. 2, the method according to the present invention comprises the following steps: (1) Use dried sludge, fly ashes or dry clay directly as a carrier for drying sludge; (2) Transport the carrier for drying sludge and dehydrated sludge to be dried to a stirring and mixing apparatus for stirring and mixing and thereby obtain mixed sludge; (3) Transport the mixed sludge to a drying apparatus for drying; (4) Repeat steps (2) and (3); In said step (4) a portion of the mixed sludge obtained from the stirring and mixing apparatus which is in an amount determined by amount of sludge carrier required for drying is extracted and transported to the drying apparatus for drying and thereby obtaining a carrier for drying sludge whereas the rest of the mixed sludge being the final product is discharged as final product. In said step (2), the dehydrated sludge to be dried has a water content of 51-69%, the carrier for drying sludge has a water content of 1-10% and a particle size of 0.25-1.0 mm in diameter. In said step (2), the portion of the mixed sludge obtained from the stirring and mixing apparatus after mixing for transporting to the drying apparatus and the rest of the mixed sludge being the final product both have a water content of 25-35%. In said step (1) to step (4), sludge drying temperature is 70-200° C., input air temperature is 150-450° C., mixed temperature of sludge and hot air is 70-250° C. and temperature of tail gas is 50-120° C. In said step (2), stirring is performed at a linear velocity of 100-527 m per minute.

The dehydrated sludge of said step (2) is obtained by dehydration of sludge produced by water treatment, or sludge sediments from lakes, ponds, rivers, streams, channels, ditches or drainage, or sludge produced by light industries, chemical industries and food processing industries.

The dehydrated sludge as mentioned above is obtained from a plate and frame filter press after pressing and filtering.

Embodiment 1 of the second method according to the present invention is described as follows:

A pressed and filtered cake of sludge (dehydrated sludge being dehydrated by pressing and filtering) obtained from a plate and frame filter press with a water content of 64% is transported to a stirring and mixing apparatus by a spiral conveyor for mixing with fly ashes with a water content of 1.6% which serve as a carrier for drying dehydrated sludge. The transporting speed of the fly ashes is 14 kg per minute, the ratio of dry sludge to wet sludge is fixed at 1.21 to 1 and the transporting speed of wet (dehydrated) sludge is 12 kg per minute. The mixed sludge discharged from the stirring and mixing apparatus after mixing has a water content of 30%. A portion of the mixed sludge is then used as a carrier for drying sludge and continues to be dried whereas the rest of the mixed sludge is packed as final product after drying. The resulting final product of dried sludge has a water content of 30%.

Embodiment 2 of the second method according to the present invention is described as follows:

A pressed and filtered cake of sludge (dehydrated sludge being dehydrated by pressing and filtering) obtained from a plate and frame filter press with a water content of 65% is transported to a stirring and mixing apparatus by a spiral conveyor for mixing with dry clay with a water content of 1.4% which serves as a carrier for drying dehydrated sludge. The transporting speed of the dry clay is 14 kg per minute, the ratio of dry sludge to wet sludge is fixed at 1.15 to 1 and the transporting speed of wet (dehydrated) sludge is 12 kg per minute. The mixed sludge discharged from the stirring and mixing apparatus after mixing has a water content of 31%. A portion of the mixed sludge is then used as a carrier for drying sludge and continues to be dried whereas the rest of the mixed sludge is packed as final product after drying. The resulting final product of dried sludge has a water content of 31%.

Figure 3:
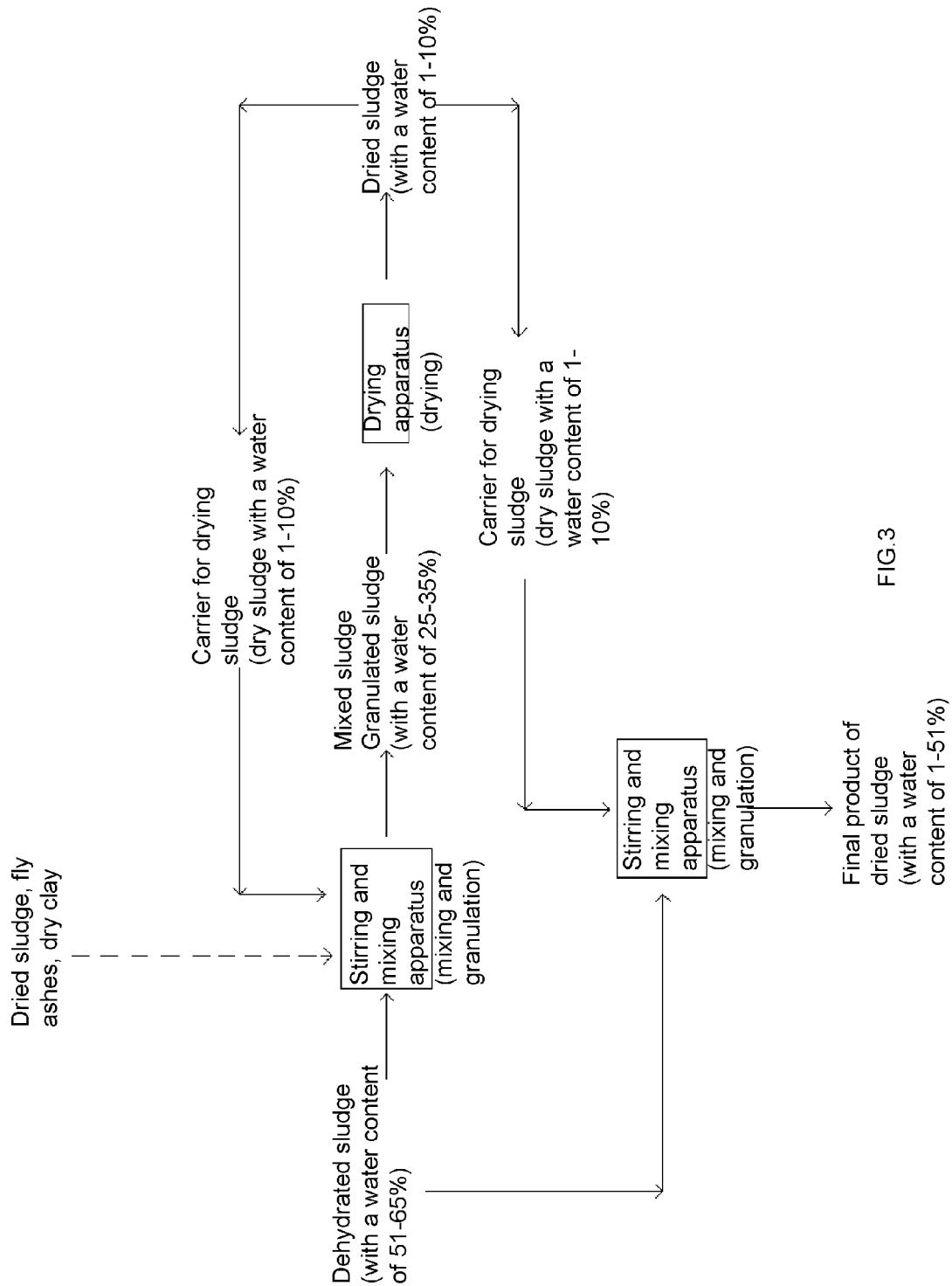
FIG. 3 is the flow chart of the third method of the present invention.

The third method according to the present invention is described as follows:

As shown in FIG. 3, the method according to the present invention comprises the following steps: (1) Use dried sludge, fly ashes or dry clay directly as a carrier for drying sludge; (2) Transport the carrier for drying sludge and dehydrated sludge to be dried to a stirring and mixing apparatus for stirring and mixing and thereby obtain mixed sludge; (3) Transport the mixed sludge to a drying apparatus for drying; (4) Repeat steps (2) and (3); A portion of the dried sludge obtained from the drying apparatus in said step (3) which is in an amount determined by amount of sludge carrier required for drying is extracted and transported to the stirring and mixing apparatus for stirring and mixing with the dehydrated sludge to be dried and thereafter transported to the drying apparatus for drying. The rest of the dried sludge still being the carrier for drying sludge is then transported to another stirring and mixing apparatus for stirring and mixing with the dehydrated sludge to be dried and thereby obtaining final product of sludge drying.

In said step (2), the dehydrated sludge to be dried has a water content of 51-69%. The carrier for drying sludge has a water content of 1-10% and a particle size of 0.25-1.0 mm in diameter.

In said step (2), the mixed sludge obtained after mixing by the stirring and mixing apparatus has a water content of 25-35%. The mixed sludge is then transported to a drying apparatus for drying. In said step (4), the final product of sludge drying has a water content of 1-60%. In said step (1) to step (4), sludge drying temperature is 70-200° C., input air temperature is 150-450° C., mixed temperature of sludge and hot air is 70-250° C. and temperature of tail gas is 50-120° C.

In said step (2), high speed stirring is performed at a linear velocity of 100-527 m per minute and an angular velocity of 55-280 revolutions per minute.

The dehydrated sludge of said step (2) is obtained by dehydration of sludge produced by water treatment, or sludge sediments from lakes, ponds, rivers, streams, channels, ditches or drainage, or sludge produced by light industries, chemical industries and food processing industries.

Embodiment 1 of the third method according to the present invention is described as follows:

A pressed and filtered cake of sludge (dehydrated sludge being dehydrated by pressing and filtering) obtained from a plate and frame filter press with a water content of 58% is transported to a stirring and mixing apparatus by a spiral conveyor for mixing with dried sludge with a water content of 2.5% which is transported to the stirring and mixing apparatus from a dry storehouse. The transporting speed of the dried sludge is 12 kg per minute, the ratio of dry sludge to wet sludge is fixed at 0.9 to 1 and the transporting speed of wet sludge is around 13.3 kg per minute. The mixed sludge discharged from the stirring and mixing apparatus after mixing has a water content of 32%. All of the mixed sludge is transported to a dryer for drying to obtain dried sludge with a water content of 2.3%, a part of which is then stored in the dry storehouse for maintaining the material supply for production and another part of which is transported to another stirring and mixing apparatus for mixing with dehydrated sludge to be dried with a water content of 58% until the water content of the mixed sludge reaches 40% and thereafter the mixed sludge is discharged as final product.

Embodiment 2 of the third method according to the present invention is described as follows:

A pressed and filtered cake of sludge (dehydrated sludge being dehydrated by pressing and filtering) obtained from a plate and frame filter press with a water content of 65% is transported to a stirring and mixing apparatus by a spiral conveyor for mixing with dried sludge with a water content of 1.8% which is transported to the stirring and mixing apparatus from a dry storehouse. The transporting speed of the dried sludge is 14 kg per minute, the ratio of dry sludge to wet sludge is fixed at 1.15 to 1 and the transporting speed of wet (dehydrated) sludge is 12 kg per minute. The mixed sludge discharged from the stirring and mixing apparatus after mixing has a water content of 31%. All of the mixed sludge is transported to a dryer for drying to obtain dried sludge with a water content of 1.8%, a part of which is then stored in the dry storehouse for maintaining the material supply for production and another part of it is transported to another stirring and mixing apparatus for mixing with pressed and filtered cake of sludge with a water content of 65% until the water content of the mixed sludge reaches 40% and thereafter the mixed sludge is discharged as final product.

Embodiment 3 of the third method according to the present invention is described as follows:

A pressed and filtered cake of sludge (dehydrated sludge being dehydrated by pressing and filtering) obtained from a plate and frame filter press with a water content of 56% is transported to a stirring and mixing apparatus by a spiral conveyor for mixing with dried sludge with a water content of 1.3% which is transported to the stirring and mixing apparatus from a dry storehouse. The transporting speed of the dried sludge is 12 kg per minute, the ratio of dry sludge to wet sludge is fixed at 0.97 to 1 and the transporting speed of wet (dehydrated) sludge is 19.2 kg per minute. The mixed sludge discharged from the stirring and mixing apparatus after mixing has a water content of 29%. All of the mixed sludge is transported to a dryer for drying to obtain dried sludge with a water content of 1.3%, a part of which is then stored in the dry storehouse for maintaining the material supply for production and another part of which is transported to another stirring and mixing apparatus for mixing with pressed and filtered cake of sludge with a water content of 56% until the water content of the mixed sludge reaches 14% and thereafter the mixed sludge is discharged as final product.

What is claimed is:

1. A method for drying sludge comprising the following steps:
   (1) Dry dehydrated sludge for use as a carrier for drying sludge;
   (2) Transport the carrier for drying sludge and dehydrated sludge to be dried to a stirring and mixing apparatus for stirring and mixing and thereby obtain mixed sludge;
   (3) Transport the mixed sludge to a drying apparatus for drying;
   (4) Repeat steps (2) and (3);
   characterized in that in said step (4) a portion of the mixed sludge obtained from the stirring and mixing apparatus which is in an amount determined by amount of sludge carrier required for drying is extracted and transported to the drying apparatus for drying and thereby obtaining the carrier for drying sludge whereas the rest of the mixed sludge is discharged as final product.

2. The method for drying sludge as in claim 1, characterized in that the method comprises the following steps:
   (1) Use dried sludge, fly ashes or dry clay directly as a carrier for drying sludge;
   (2) Transport the carrier for drying sludge and dehydrated sludge to be dried to a stirring and mixing apparatus for stirring and mixing and thereby obtain mixed sludge;
   (3) Transport the mixed sludge to a drying apparatus for drying;
   (4) Repeat steps (2) and (3);
   wherein in said step (4) a portion of the mixed sludge obtained from the stirring and mixing apparatus which is in an amount determined by amount of sludge carrier required for drying is extracted and transported to the drying apparatus for drying and thereby obtaining a carrier for drying sludge whereas the rest of the mixed sludge is discharged as final product.

3. The method for drying sludge as in claim 1, characterized in that the method comprises the following steps:
   (1) Use dried sludge, fly ashes or dry clay directly as a carrier for drying sludge;
   (2) Transport the carrier for drying sludge and dehydrated sludge to be dried to a stirring and mixing apparatus for stirring and mixing and thereby obtain mixed sludge;
   (3) Transport the mixed sludge to a drying apparatus for drying;
   (4) Repeat steps (2) and (3);

wherein a portion of the dried sludge obtained from the drying apparatus in said step (3) which is in an amount determined by amount of sludge carrier required for drying is extracted and transported to the stirring and mixing apparatus for stirring and mixing with the dehydrated sludge to be dried and thereafter transported to the drying apparatus for drying; the rest of the dried sludge still being the carrier for drying sludge is then transported to another stirring and mixing apparatus for stirring and mixing with the dehydrated sludge to be dried and thereby obtaining final product of sludge drying.

4. The method for drying sludge as in claim 1 or claim 2 or claim 3, characterized in that the dehydrated sludge to be dried according to said step (1) has a water content of 51-69%.

5. The method for drying sludge as in claim 1 or claim 2 or claim 3, characterized in that the carrier for drying sludge has a water content of 1-10% and a particle size of 0.25-1.0 mm in diameter.

6. The method for drying sludge as in claim 1 or claim 2, characterized in that in said step (2), the portion of the mixed sludge obtained from the stirring and mixing apparatus after mixing for transporting to the drying apparatus and the rest of the mixed sludge being the final product both have a water content of 25-35%.

7. The method for drying sludge as in claim 3, characterized in that in said step (4), the final product of sludge drying has a water content of 1-51%.

8. The method for drying sludge as in claim 1 or claim 2, characterized in that the mixed sludge after being mixed in the stirring and mixing apparatus in said step (2) has a mixing ratio of the dehydrated sludge to the carrier for drying sludge of 1 to 0.45-1 to 3.

9. The method for drying sludge as in claim 1 or claim 2 or claim 3, characterized in that in said step (1) to step (4), sludge drying temperature is 70-200° C., input air temperature is 150-450° C., mixed temperature of sludge and hot air is 70-250° C. and temperature of tail gas is 50-120° C.

10. The method for drying sludge as in claim 1 or claim 2 or claim 3, characterized in that in said step (2), stirring is performed at a linear velocity of 100-527 m per minute and an angular velocity of 55-280 revolutions per minute.

11. The method for drying sludge as in claim 1 or claim 2 or claim 3, characterized in that the dehydrated sludge of said step (1) can be obtained by dehydration of sludge produced by water treatment, or sludge sediments from lakes, ponds, rivers, streams, channels, ditches or drainage, or sludge produced by light industries, chemical industries and food processing industries.

* * * * *